(12) United States Patent
Tsai et al.

(10) Patent No.: US 12,203,646 B1
(45) Date of Patent: Jan. 21, 2025

(54) LIGHT LENS ASSEMBLY FOR WEARABLE ELECTRONIC DEVICE

(71) Applicant: Garmin International, Inc., Olathe, KS (US)

(72) Inventors: Cheng-Yu Tsai, New Taipei (TW); Minhung Lee, New Taipei (TW); Yu-Hung Lin, New Taipei (TW); Yung-Lang Yang, New Taipei (TW)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 18/675,976

(22) Filed: May 28, 2024

(51) Int. Cl.
| | | |
|---|---|---|
| *F21V 33/00* | (2006.01) | |
| *F21V 5/00* | (2018.01) | |
| *F21V 5/04* | (2006.01) | |
| *G06F 1/16* | (2006.01) | |
| *F21Y 103/10* | (2016.01) | |
| *F21Y 113/00* | (2016.01) | |

(52) U.S. Cl.
CPC .......... *F21V 33/0004* (2013.01); *F21V 5/002* (2013.01); *F21V 5/045* (2013.01); *G06F 1/163* (2013.01); *F21Y 2103/10* (2016.08); *F21Y 2113/00* (2013.01)

(58) Field of Classification Search
CPC ...... F21V 33/0004; F21V 5/002; F21V 5/045; G06F 1/163
See application file for complete search history.

(56) References Cited

U.S. PATENT DOCUMENTS

| | | | | |
|---|---|---|---|---|
| 11,347,189 | B1* | 5/2022 | Herrera | H04N 23/51 |
| 2020/0169627 | A1* | 5/2020 | Netzer | H04M 1/72412 |
| 2022/0338325 | A1* | 10/2022 | Hosler | G04G 21/025 |
| 2023/0033151 | A1* | 2/2023 | Her | G03B 21/145 |
| 2023/0058052 | A1* | 2/2023 | Al-Ali | A61B 5/02055 |
| 2024/0188889 | A1* | 6/2024 | Tankiewicz | A61B 5/02438 |

\* cited by examiner

*Primary Examiner* — Christopher E Dunay
(74) *Attorney, Agent, or Firm* — Samuel M. Korte; Max M. Ali

(57) ABSTRACT

A wrist-wearable electronic device comprising a house, a display, and a lens module. The lens module is coupled to a sidewall of the housing and can include a first light emitting element, a lens, and a first Frensel structure. The lens includes a body, a lower surface, and an upper surface. The first Frensel structure is disposed on the lower surface of the lens and is configured to disperse light generated by the first light emitting element into the body of the lens.

10 Claims, 9 Drawing Sheets

US 12,203,646 B1

LIGHT LENS ASSEMBLY FOR WEARABLE ELECTRONIC DEVICE

BACKGROUND

Wearable electronic devices, such as global navigation satellite system (GNSS)-enabled smartwatches like the Garmin Forerunner® or Fēnix®, are often used by athletes to measure speed, distance, and other metrics during exercise. Some of these devices include flashlight functionality to assist users.

BRIEF DESCRIPTION OF THE DRAWINGS

The detailed description references the accompanying figures. The use of the same reference numbers in different instances in the description and the figures may indicate similar or identical items. In addition, the proportion and the relative scale of the elements provided in the figures are intended to illustrate various embodiments of the present disclosure and are not to be used in a limiting sense.

DETAILED DESCRIPTION

The present disclosure includes a wrist-wearable electronic device including a light emitting element to assist a user to see and/or be seen. The wrist-wearable electronic device includes a lens module to improve the lighting abilities of light emitting elements. In some examples, the lens module includes a Fresnel structure to better disperse light generated by the light emitting elements. Such functionality enables embodiments of the present invention to provide wearable electronic devices with superior lighting abilities compared to previous designs.

Figure 1:
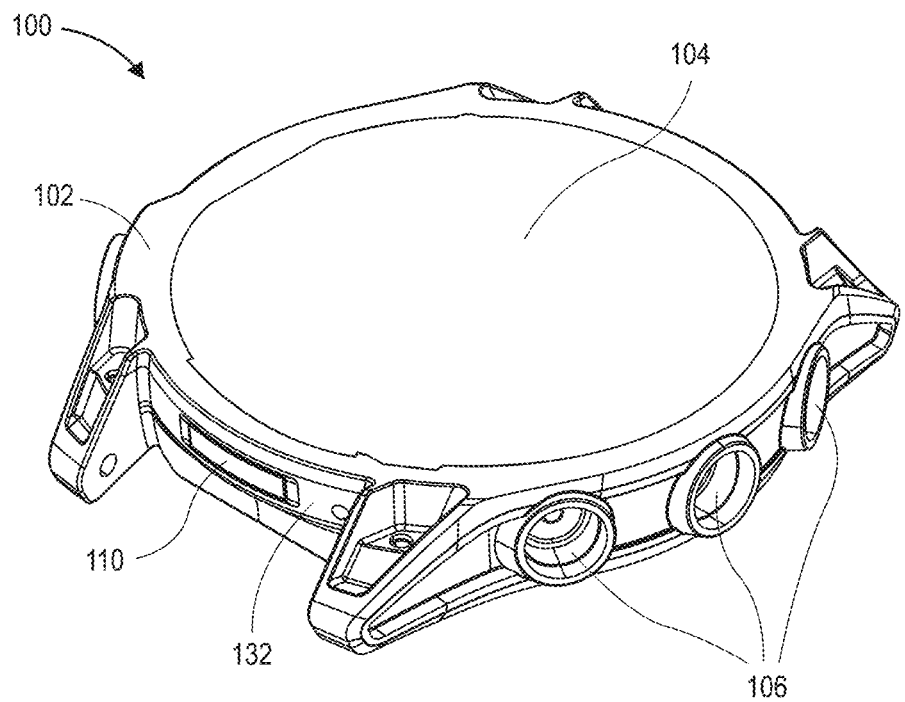
FIG. 1 is a perspective view of an example wrist-wearable electronic device configured in accord with various embodiments of the present invention.

FIG. 1 is a perspective view of a wrist-wearable electronic device 100 including a lens module 110 in accordance with one or more embodiments of the present disclosure. The features described herein may be implemented on the wrist-wearable electronic device 100, in combination with an electronic device capable of accurately measuring position, in combination with an electronic device including a number of sensors, and/or in combination with an electronic device running an application. Wrist-wearable electronic device 100 is operable to provide fitness information and/or navigation functionality to the user of the wrist-wearable electronic device 100. The wrist-wearable electronic device 100 may be configured in a variety of ways. For instance, wrist-wearable electronic device 100 may be configured for use during fitness and/or sporting activities and comprise a cycle computer, a sport watch, a golf computer, fitness or sporting applications (e.g., apps), GNSS used for hiking, and so forth.

The wrist-wearable electronic device 100 includes a housing 102. The housing 102 is configured to house (e.g., substantially enclose) various components of the wrist-wearable electronic device 100. The housing 102 may be formed from a lightweight and/or impact-resistant material such as plastic, nylon, or combinations thereof. The housing 102 may be formed from a non-conductive material, such a non-metal material, for example. In some embodiments, the housing 102 may be formed from a conductive material, such as metal, or a semi-conductive material. The housing 102 may include one or more gaskets (e.g., a seal) to make the wrist-wearable electronic device 100 substantially waterproof or water resistant. A location for a battery and/or another power source for powering one or more components of the wrist-wearable electronic device 100 may be included in the housing 102. The housing 102 may be a singular piece or may include a plurality of sections.

The housing 102 can include a sidewall 132 to which the lens module 110 is coupled. The lens module 110 can include one or more light emitting elements 112. The illustrated examples of FIGS. 5-11 include a first light emitting element 112-1, a second light emitting element 112-2, and/or a third light emitting element 112-3. The light emitting elements 112-1, 112-2, 112-3 can be individually or collectively referred to as light emitting elements 112. In some embodiments, lens module 110 can be on the sidewall 132, behind the sidewall 132, within the sidewall 132, or any combination thereof. The light emitting elements 112 can be LEDs, micro LEDs, OLEDs, or any combination thereof.

The lens module 110 can be located at a clock position between 10:00 and 2:00 to illuminate the ground around and in front of a user as the user walks and/or runs while limiting the amount of light that may shine into the user's eyes or the eyes of those nearby. Locating the lens module 110 at the clock position between 10:00 and 2:00 also allows ambidextrous functionality so that the wrist-wearable electronic device 100 will be equally useful when the wrist-wearable electronic device 100 is worn on the right or left wrist of the user. When the lens module 110 is coupled to the sidewall 132 of the wrist-wearable electronic device 100, less light from the lighting emitting elements 112 will go into the user's eyes when the user looks at a display (e.g., display 104 in FIG. 1) of the wrist-wearable electronic device 100 because the light generated by the light emitting elements 112 is substantially perpendicular to the display. This allows the user to use the display even when the light emitting elements 112 are generating light. The lens module 110 may be coupled with sidewall 132 through integration within the sidewall 132, forming a portion of the sidewall 132, attaching to outside wall of the sidewall 132, combinations thereof, and the like.

The wrist-wearable electronic device 100 includes a display 104. The display 104 may include a liquid crystal display (LCD), a thin film transistor (TFT), an LED, a light-emitting polymer (LEP), and/or a polymer light-emitting diode (PLED). However, embodiments are not so limited. The display 104 may be capable of displaying text and/or graphical information. The display 104 may be backlit via a backlight, for example, such that it may be viewed in the dark or other low-light environments. One example of the display 104 is a 100 pixel by 64 pixel film compensated super-twisted nematic display (FSTN) including a bright white LED backlight. However, embodiments are not so limited. The display 104 may include a transparent lens that covers and/or protects components of the wrist-wearable electronic device 100.

The display 104 may be provided with a touch screen to receive input (e.g., data, commands, etc.) from a user. For example, a user may operate the wrist-wearable electronic device 100 by touching the touch screen and/or by performing gestures on the display 104. In some embodiments, the display 104 may be a capacitive touch screen, a resistive touch screen, an infrared touch screen, or any combinations thereof.

The wrist-wearable electronic device 100 may also include a communication module representative of communication functionality to permit the wrist-wearable electronic device 100 to send/receive data between different devices (e.g., components/peripherals) and/or over one or more networks. The communication module may be representative of a variety of communication components and functionality including, but not limited to an antenna, a browser, a transmitter and/or receiver, a wireless radio, a data port, a software interface, a software driver, a networking interface, and/or a data processing component. The wrist-wearable electronic device 100 may be configured to communicate via one or more networks with a cellular provider and/or an Internet provider to receive mobile phone service and/or various content, respectively. Content may represent a variety of different content, examples of which include, but are not limited to map data including route information, web pages, services, music, photographs, video, email service, instant messaging, device drivers, real-time and/or historical weather data, instruction updates, and so forth.

The one or more networks are representative of a variety of different communication pathways and network connections which may be employed, individually or in combinations, to communicate among various components. Thus, the one or more networks may be representative of communication pathways achieved using a single network or multiple networks. Further, the one or more networks are representative of a variety of different types of networks and connections that are contemplated including, but not limited to, the Internet, an intranet, a satellite network, a cellular network, a mobile data network, wired and/or wireless connections, and so forth. Examples of wireless networks include, but are not limited to, networks configured for communications according to one or more standards of the Institute of Electrical and Electronics Engineers (IEEE), such as 802.11 or 802.16 (Wi-Max) standards, Wi-Fi standards promulgated by the Wi-Fi Alliance, Bluetooth standards promulgated by the Bluetooth Special Interest Group, and so on. Wired communications are also contemplated such as through universal serial bus (USB), Ethernet, serial connections, and so forth.

Figure 2:
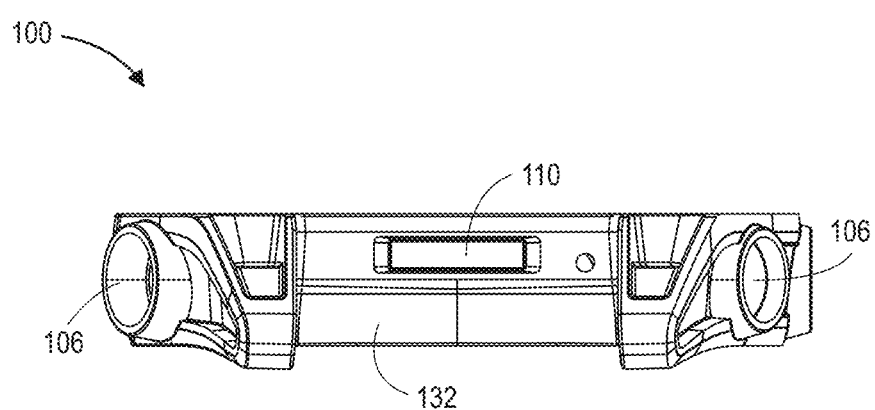
FIG. 2 is a side view of the wearable device of FIG. 1.

The wrist-wearable electronic device 100 may further include one or more input/output (I/O) devices (e.g., a keypad, buttons, a wireless input device, a thumbwheel input device, a trackstick input device, a microphone, a speaker, etc.). In accordance with one or more embodiments of the present disclosure, the wrist-wearable electronic device 100 can include a number of control buttons 106. As illustrated in FIGS. 1-2, the control buttons 106 can be associated with (e.g., adjacent) the housing 102. While FIG. 1A illustrates five control buttons 106 associated with the housing 102, embodiments are not so limited and may include any number of buttons or no buttons at all. The control buttons 106 are configured to control a number of functions of the wrist-wearable electronic device 100.

Functions of the wrist-wearable electronic device 100 may be associated with a location determining component (e.g., location determining component 242 in FIG. 2) and/or a performance monitoring component (e.g., performance monitoring component 244 in FIG. 2). Functions of the wrist-wearable electronic device 100 may include, but are not limited to, displaying a current geographic location of the wrist-wearable electronic device 100, mapping a location on the display 104, locating a desired location and displaying the desired location on the display 104, monitoring a user's heart rate, monitoring a user's speed, monitoring a distance traveled, calculating calories burned, and the like.

In some embodiments, user input may be provided from movement of the housing 102. For example, an accelerometer may be used to identify tap inputs on the housing 102 or upward and/or sideways movements of the housing 102. In some embodiments, user input may be provided from touch inputs identified using various touch sensing technologies, such as resistive touch or capacitive touch interfaces.

In accordance with one or more embodiments of the present disclosure, the wrist-wearable electronic device 100 can include a strap to secure the device 100 to a user's wrist, arm, or other body part. The strap may be removably secured to the housing 102 via attachment of securing elements to corresponding connecting elements. Examples of securing elements and/or connecting elements include, but are not limited to hooks, latches, clamps, snaps, and the like. The strap may be made of a lightweight and resilient thermoplastic elastomer and/or a fabric, for example, such that the strap may encircle a portion of a user without discomfort while securing the housing 102 to the user. The strap may be configured to attach to various portions of a user, such as a user's leg, waist, wrist, forearm, and/or upper arm.

The double tap can be a double tap of a single control button 106 or multiple control buttons 106. The first light, the second light, and/or the third light can each be the same color or different colors. For example, the first light generated by the first light emitting element 112-1 and the third light generated by the third light emitting element 112-3 can be white lights and the second light generated by the second light emitting element 112-2 can be a red light FIG. 2 is a block hardware diagram of a wrist-wearable electronic device 200 including a number of light emitting elements 212-1 and 212-2. The wrist-wearable electronic device 200 can correspond to the wrist-wearable electronic device 100 in FIGS. 1A and 1B and the light emitting elements 212-1 and 212-2 can correspond to light emitting elements 112 in FIGS. 1A and 1B. The wrist-wearable electronic device 200 can include a number of control buttons 206-1 and 206-2 corresponding to control buttons 106 in FIGS. 1A and 1B, a display 204 corresponding to display 104 in FIG. 1A, and housing 202 corresponding to housing 102 in FIGS. 1A and 1B. The wrist-wearable electronic device 200 can further include a location determining component 242 and a performance monitoring component 244.

In a number of embodiments, the location determining component 242 can be included in the housing 202 and can be coupled to the number of control buttons 206-1 and 206-2, the performance monitoring component 244, and/or the display 204. The location determining component 242 may include an antenna 211 having a ground plane. The ground plane may be formed by coupling a printed circuit board and/or a conductive cage with the antenna 211. The antenna 211 and the ground plane may be coupled using solder, connection elements, or combinations thereof. Location determining component 242 may include one or more antennas 211 to receive signal data as well as to perform other communications, such as communication via one or more networks.

The location determining component 242 may be a GNSS receiver that is configured to provide geographic location information to the wrist-wearable electronic device 200. The location determining component 242 may be, for example, a GNSS receiver such as those provided in various products by GARMIN®. Generally, GNSS is a satellite-based radio navigation system capable of determining continuous position, velocity, time, and direction information. Multiple users may simultaneously utilize GNSS. GNSS incorporates a plurality of GNSS satellites that orbit the earth. Based on these orbits, GNSS satellites can relay their location to a GNSS receiver. For example, upon receiving a GNSS signal (e.g., a radio signal) from a GNSS satellite, the wrist-wearable electronic device 200 disclosed herein can determine a location of that satellite. The wrist-wearable electronic device 200 can continue scanning for GNSS signals until it has acquired a number (e.g., at least three) of different GNSS satellite signals. The wrist-wearable electronic device 200 may employ geometrical triangulation, where the wrist-wearable electronic device 200 utilizes the known GNSS satellite positions to determine a position of the wrist-wearable electronic device 200 relative to the GNSS satellites. Accordingly, geographic location information and/or velocity information can be updated in real time on a continuous basis for the wrist-wearable electronic device 200.

The location determining component 242 may also be configured to provide a variety of other position-determining functionality. Location determining functionality, for purposes of discussion herein, may relate to a variety of different navigation techniques and other techniques that may be supported by a determination of one or more positions. For instance, location determining functionality may be employed to provide position/location information, timing information, speed information, and a variety of other navigation-related data. Accordingly, the location determining component 242 may be configured in a variety of ways to perform a wide variety of functions. For example, the location determining component 242 may be configured for outdoor navigation, vehicle navigation, aerial navigation (e.g., for airplanes and helicopters), marine navigation, personal use (e.g., as part of fitness-related equipment), and so forth. Accordingly, the location determining component 242 may include a variety of devices to determine position using one or more of the techniques previously described.

The location determining component 242, for instance, may use signal data received via a GNSS receiver in combination with map data that is stored in memory (e.g., memory 328 in FIG. 3) to generate navigation instructions (e.g., turn-by-turn instructions) to an input destination or point of interest (POI)), show a current position on a map, and so on. The location determining component 242 may also provide other positioning functionality, such as to determine an average speed and/or calculate an arrival time.

The location determining component 242 may include and/or be coupled to one or more processors (e.g., processor 314 in FIG. 3), controllers, and/or other computing devices as well as a memory for storing information accessed and/or generated by the processors or other computing devices. The processor may be electrically coupled with a printed circuit board and operable to process position determining signals received by the antenna 211. The antenna 211, is configured to receive and/or transmit position determining signals, such as GNSS signals from GNSS satellites, to determine a current geographic location of the wrist-wearable electronic device 200.

The memory may store cartographic data (e.g., cartographic data 330) and routing used by or generated by the location determining component 242. The memory is an example of device-readable storage media that provides storage functionality to store various data associated with the operation of the wrist-wearable electronic device 200, such as the software program and code segments mentioned above, or other data to instruct the processor and other elements of the wrist-wearable electronic device 200 to perform the techniques described herein.

Antenna 211 may be any antenna capable of receiving wireless signals from a remote source, including directional antennas and omnidirectional antennas. Antenna 211 may include any type of antenna in which the length of the ground plane affects the efficiency of the antenna. In accordance with one or more embodiments of the present disclosure, the antenna 211 is an omnidirectional antenna having a ground plane. An omnidirectional antenna may receive and/or transmit in both orthogonal polarizations, depending upon direction. In other words, omnidirectional antennas do not have a predominant direction of reception and/or transmission. Examples of omnidirectional antennas include, but are not limited to, inverted-F antennas (IFAs) and planar inverted-F antennas (PIFAs). In contrast to omnidirectional antennas, directional antennas have a primary lobe of reception and/or transmission over an approximate seventy (70) by 70 degree sector in a direction away from the ground plane. Examples of directional antennas include, but are not limited to, microstrip antennas and patch antennas.

In accordance with one or more embodiments of the present disclosure, the antenna 211 may be an embedded antenna. As used herein, an embedded antenna refers to an antenna that is positioned completely within a device housing. For example, antenna 211 may be positioned completely within housing 202. In some embodiments, antenna 211 may be an external antenna with all or a portion of the antenna 211 exposed from housing 202.

As discussed, the location determining component 242 can include or be coupled to the antenna 211. The antenna 211 may be associated with (e.g., formed on and/or within) an antenna support assembly. Antenna 211 may be positioned on a top portion or one or more side portions of the antenna support assembly. In some embodiments, the antenna support assembly and antenna 211 may be positioned in a center of a top surface, bottom surface, or to a side of the printed circuit board. The printed circuit board may support the bottom portion of the antenna support assembly.

The printed circuit board can be included in or coupled to the location determining component 242 and may support a number of processors, microprocessors, controllers, microcontrollers, programmable intelligent computers (PIC), field-programmable gate arrays (FPGA), other processing components, other field logic devices, application specific integrated circuits (ASIC), and/or a memory that is configured to access and/or store information that is received or generated by the wrist-wearable electronic device 200.

The performance monitoring component 244 may be positioned within the housing 202 and can be coupled to the number of control buttons 206-1 and 206-2, the location determining component 242, and/or the display 204. The performance monitoring component 244 may receive information including, but not limited to, geographic location information from the location determining component 242. The geographic location information can be used to perform a function, such as monitoring performance and/or calculating performance values and/or information related to the wrist-wearable electronic device 200 user's movement (e.g., exercise). The performance values may include, for example, a heart rate of the user, a speed of the user, a total distance traveled by the user, a total distance goal, a speed goal, a pace of the user, a cadence of the user, and/or calories burned by the user. These values and/or information may be presented on the display 204.

In some embodiments, the wrist-wearable electronic device 200 includes a user interface, which is storable in memory and executable by the processor. The user interface is representative of functionality to control the display of information and data to the user of the wrist-wearable electronic device 200 via the display 204. In some implementations, the display 204 may not be integrated into the wrist-wearable electronic device 200 and may instead be connected externally using universal serial bus (USB), Ethernet, serial connections, and so forth.

The user interface may provide functionality to allow the user to interact with one or more applications of the wrist-wearable electronic device 200 by providing inputs via a touch screen and/or I/O devices. For example, the user interface may cause an application programming interface (API) to be generated to expose functionality to an application to configure the application for display by the display 204 or in combination with another display. In embodiments, the API may further expose functionality to configure the application to allow the user to interact with an application by providing inputs via the touch screen and/or the I/O devices. Applications may comprise software, which is storable in memory and executable by the processor, to perform a specific operation or group of operations to furnish functionality to the wrist-wearable electronic device 200. Example applications may include a fitness application, an exercise application, a health application, a diet application, a cellular telephone application, an instant messaging application, an email application, a photograph sharing application, a calendar application, an address book application, and so forth.

In some embodiments, the user interface may include a browser. The browser enables the wrist-wearable electronic device 200 to display and interact with content such as a webpage within the World Wide Web, a webpage provided by a web server in a private network, and so forth. The browser may be configured in a variety of ways. For example, the browser may be configured as an application accessed by the user interface. The browser may be a web browser suitable for use by a full resource device with substantial memory and processor resources (e.g., a smart phone, a personal digital assistant (PDA), etc.). However, in one or more implementations, the browser may be a mobile browser suitable for use by a low-resource device with limited memory and/or processing resources (e.g., a mobile telephone, a portable music device, a transportable entertainment device, etc.). Such mobile browsers typically conserve memory and processor resources but may offer fewer browser functions than web browsers.

Figure 3:
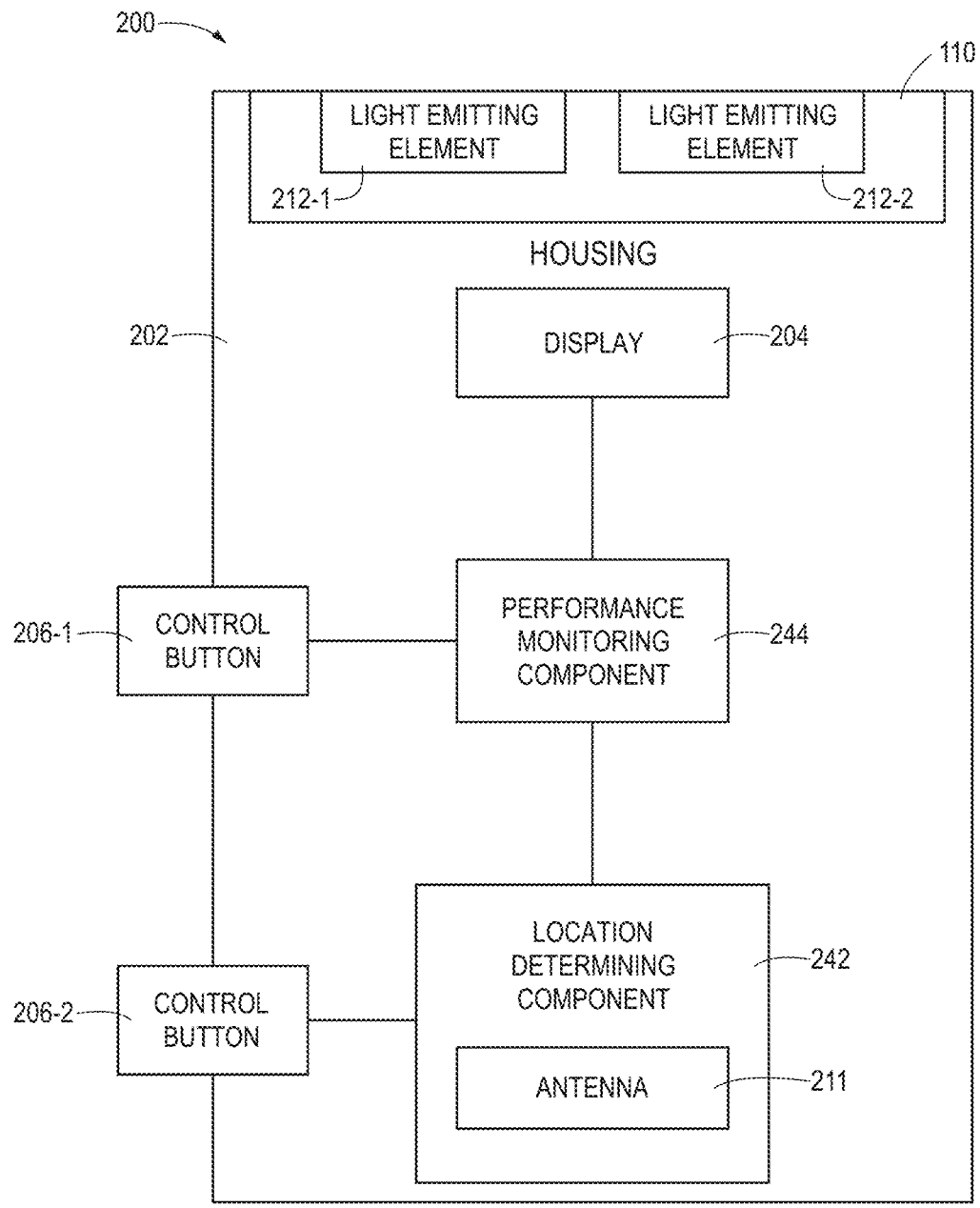
FIG. 3 is block hardware diagram of the example wearable device of FIG. 1.
Figure 4:
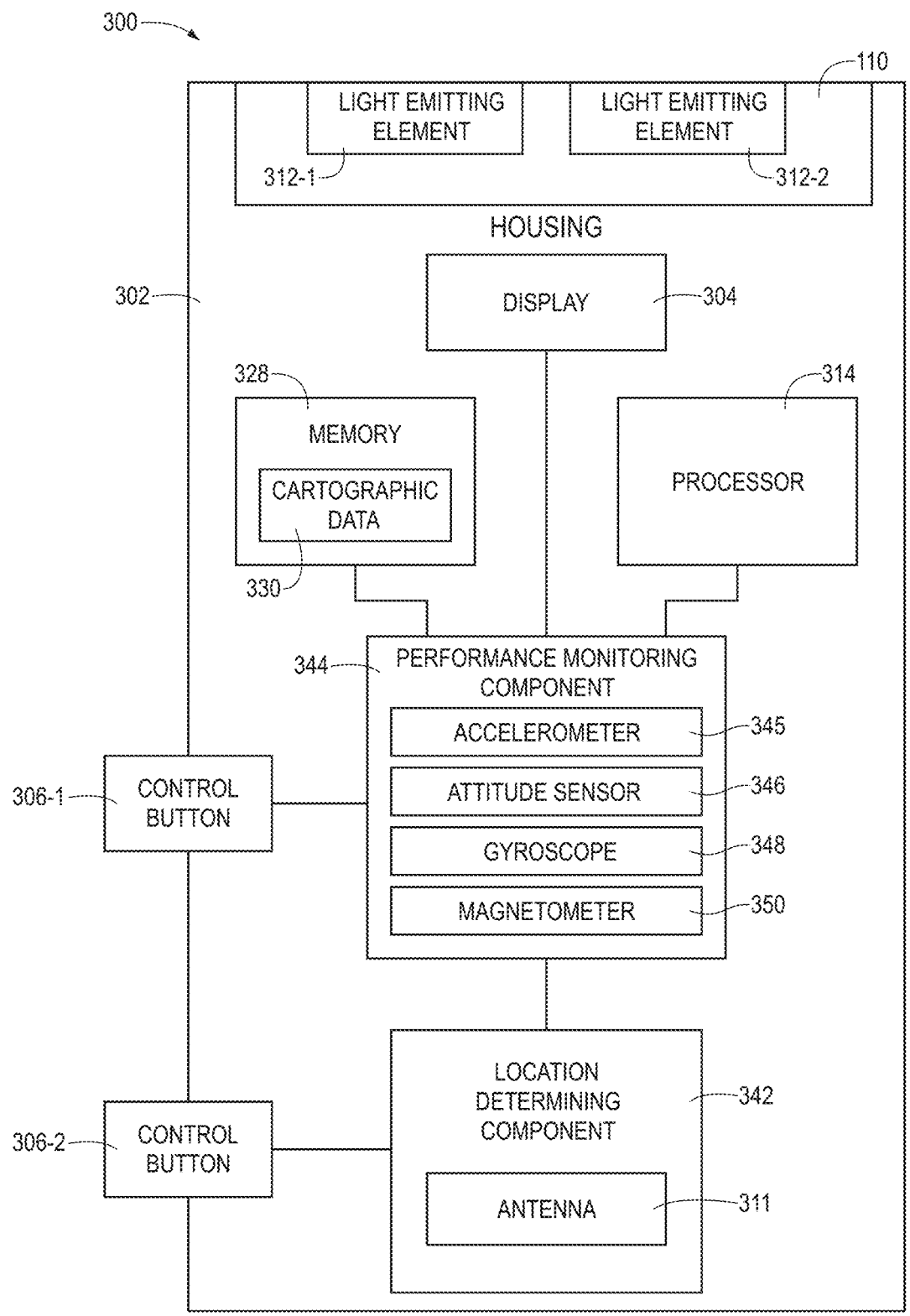
FIG. 4 is another block hardware diagram showing another example configuration of the device of FIG. 1.

FIG. 3 is a block hardware diagram of a wrist-wearable electronic device 300 including lens module 110 and a number of light emitting elements 312-1 and 312-2. The wrist-wearable electronic device 300 can correspond to the wrist-wearable electronic device 200 in FIG. 2 and the light emitting elements 312-1 and 312-2 can correspond to the light emitting elements 212-1 and 212-2 in FIG. 2. The wrist-wearable electronic device 300 can include a housing 302, a display 304, a number of control buttons 306-1 and 306-2, a location determining component 342, an antenna 311, and a performance monitoring component 344, which can correspond to the housing 202, the display 204, the number of control buttons 206-1 and 206-2, the location determining component 242, the antenna 211, and the performance monitoring component 244 in FIG. 2, respectively.

The wrist-wearable electronic device 300 can further include a processor 314 and a memory 328. The processor 314 may provide processing functionality for the wrist-wearable electronic device 300 and may include any number of processors, microcontrollers, or other processing systems, and resident or external memory 328 for storing data and other information accessed or generated by the wrist-wearable electronic device 300. The processor 314 may execute one or more software programs that implement the techniques and modules described herein. The processor 314 is not limited by the materials from which it is formed, or the processing mechanisms employed therein and, as such, may be implemented via semiconductor and/or transistors (e.g., electronic integrated circuits (ICs)), and so forth.

In some embodiments, the processor 314 can be configured to transmit a first command to the first light emitting element 312-1 and a second command to the second light emitting element 312-2 included in the housing 302. The first light emitting element 312-1 can be configured to receive the first command from the processor 314 and generate a first color light for a first period of time in response to receiving the first command from the processor 314. The second light emitting element 312-2 can be configured receive the second command from the processor 314 and generate a second color light for a second period of time in response to receiving the second command from the processor 314.

The performance monitoring component 344 can include an accelerometer 345, an attitude sensor 346, a gyroscope 348, and a magnetometer 350. The accelerometer 345 can be configured to generate acceleration data of the wrist-wearable electronic device 300, the attitude sensor 346 can be configured to generate attitude data of the wrist-wearable electronic device 300, the gyroscope 348 can be configured to measure an angular velocity of the wrist-wearable electronic device 300, and the magnetometer 350 can be configured to measure a strength of a magnetic field, a direction of the magnetic field, or a combination thereof. As shown in FIG. 3, the processor 314 can be coupled to the accelerometer 345, the attitude sensor 346, the gyroscope 348, and the magnetometer 350.

The memory 328 can be coupled to the processor 314. The memory 328 is an example of device-readable storage media that provides storage functionality to store various data associated with the operation of the wrist-wearable electronic device 300, such as the software program and code segments mentioned above, or other data to instruct the processor 314 and other elements of the wrist-wearable electronic device 300 to perform the techniques described herein. A wide variety of types and combinations of memory may be employed. The memory 328 may be integral with the processor, stand-alone memory, or a combination of both. The memory may include, for example, removable and non-removable memory elements such as RAM, ROM, Flash (e.g., SD Card, mini-SD card, micro-SD Card, Trans-Flash card), magnetic, optical, USB memory devices, and so forth.

The memory 328 can store cartographic data 330. The processor 314 can be configured to determine an intensity, a color, a strobe frequency, or any combination thereof of the first light emitting element 312-1, the second light emitting element 312-2, or any combination thereof based on the cartographic data 330.

Figure 5:
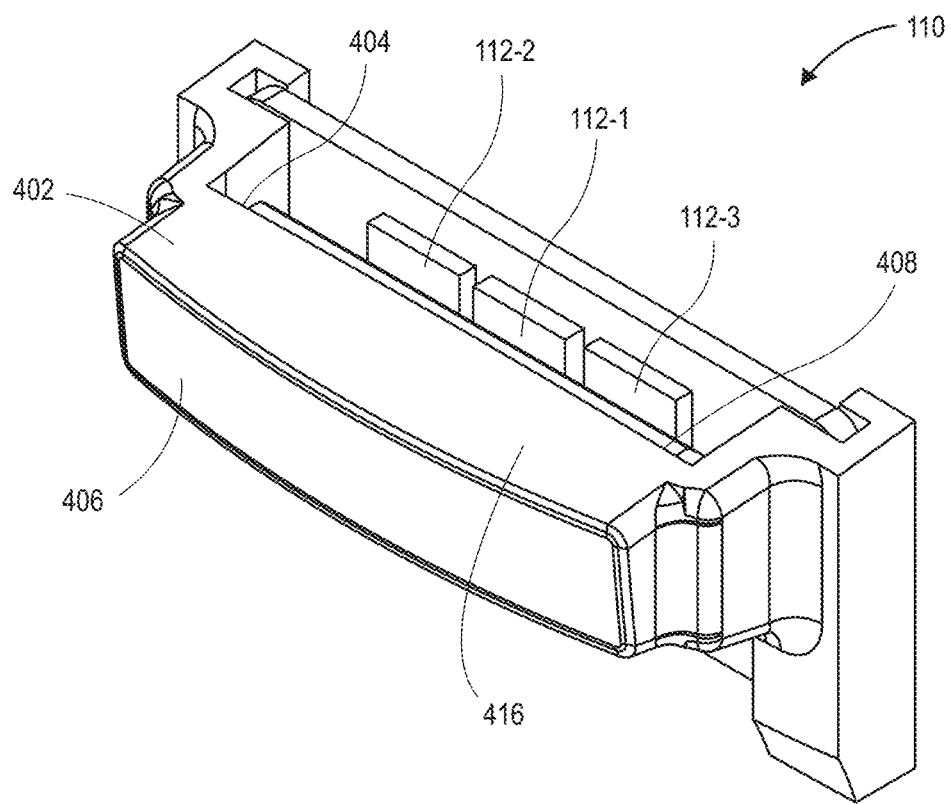
FIG. 5 is a perspective view of an example lens module utilized by the device of FIG. 1.
Figure 6:
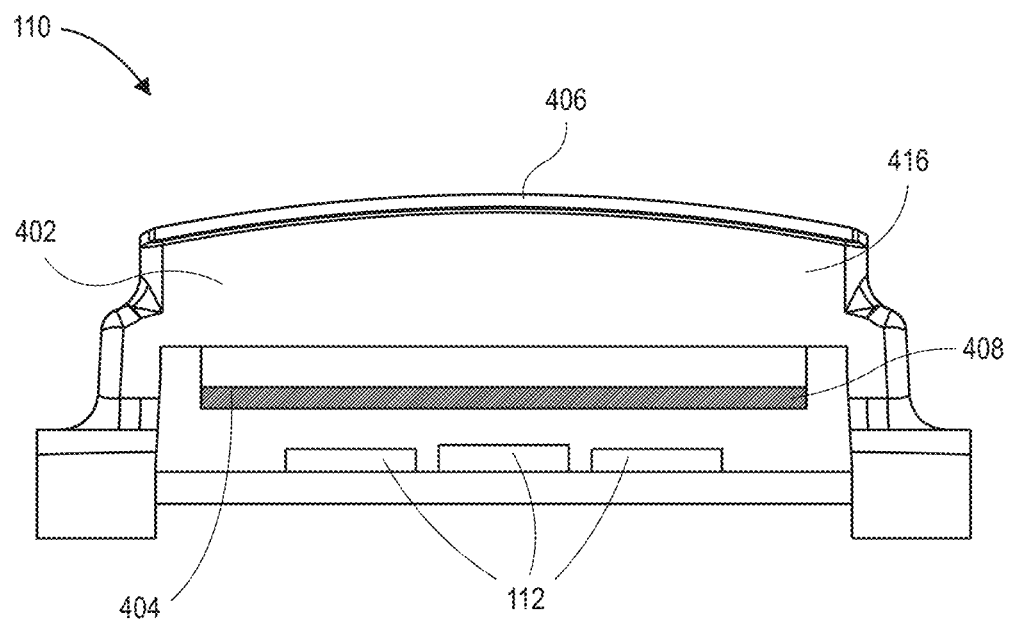
FIG. 6 is a side view of the lens module of FIG. 5.
Figure 7:
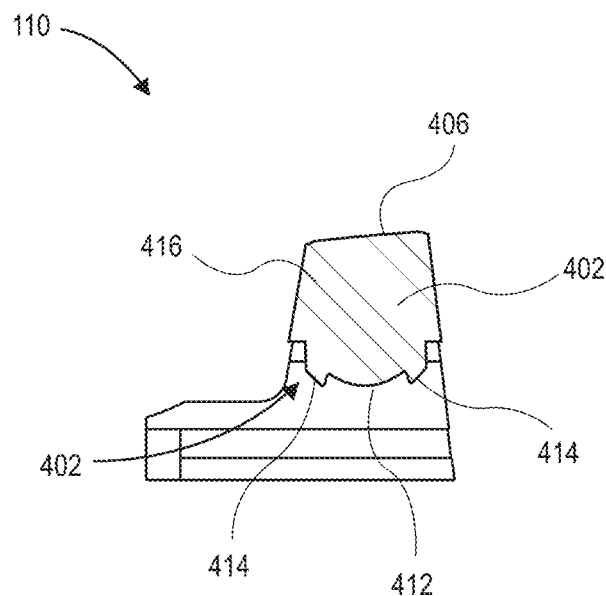
FIG. 7 is a cross section view of the lens module of FIG. 6 along am midpoint of the lens module.
Figure 8:
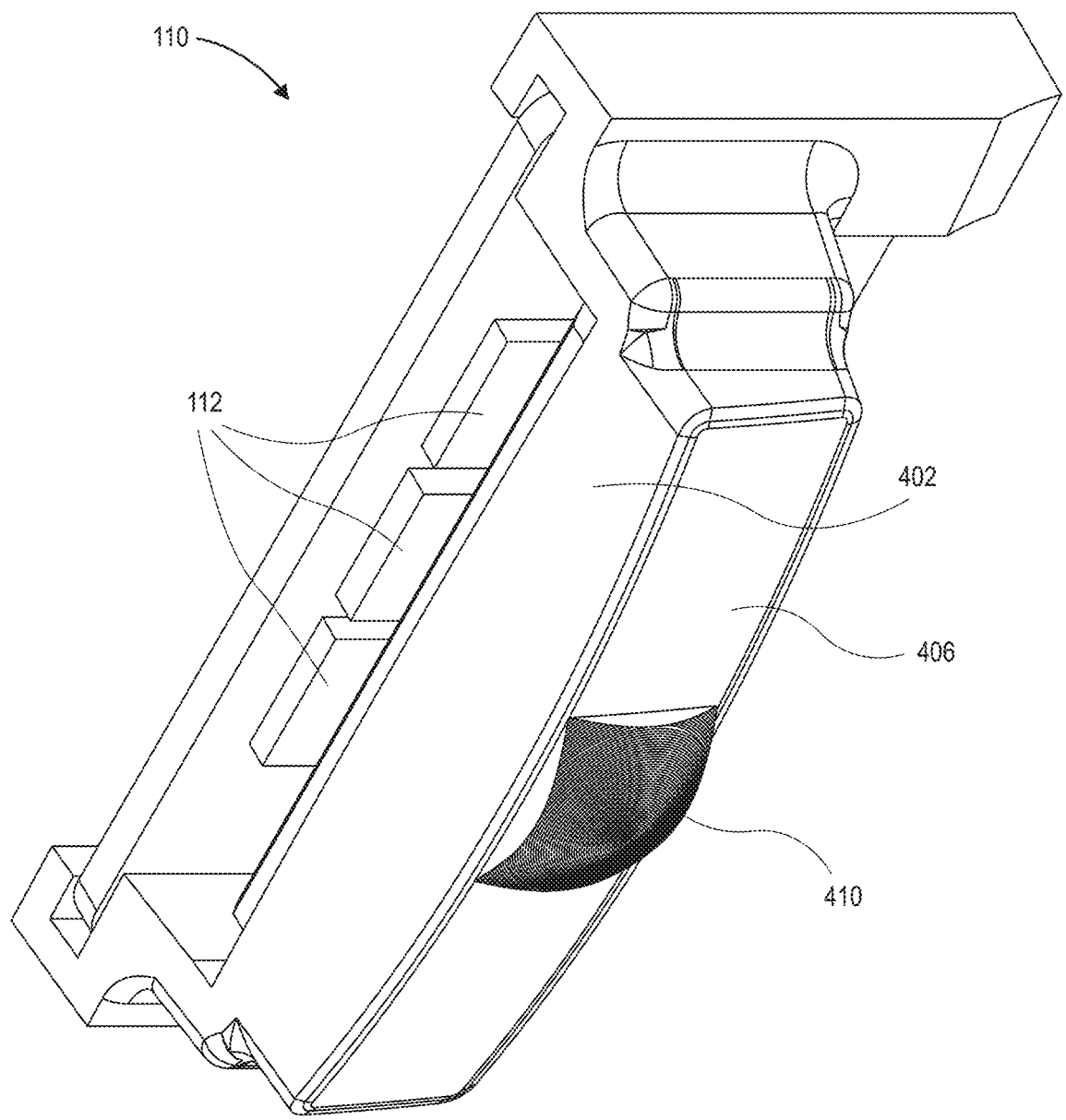
FIG. 8 is a perspective view of a second example lens module.
Figure 9:
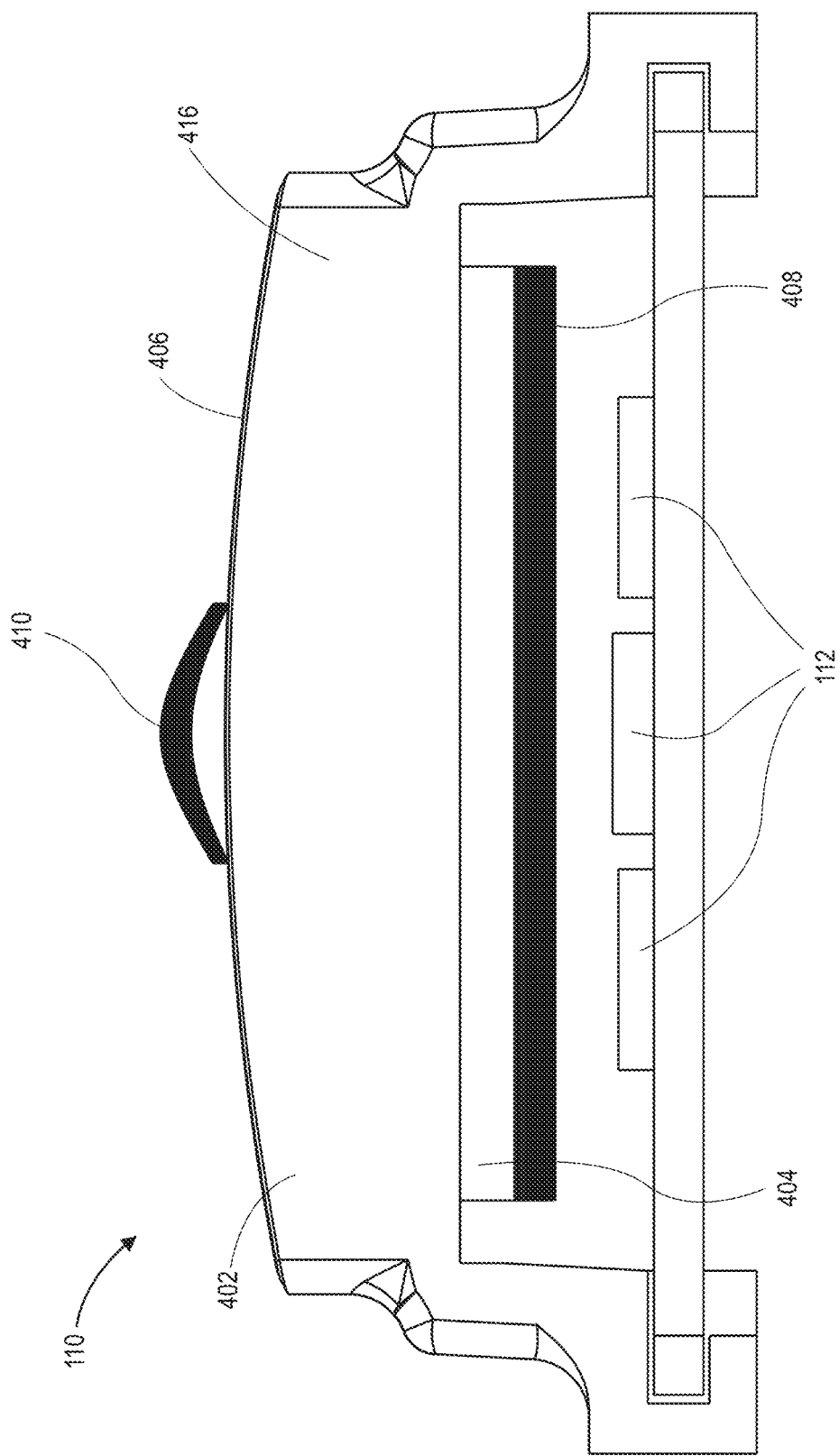
FIG. 9 is a side view of the lens module of FIG. 8.
Figure 10:
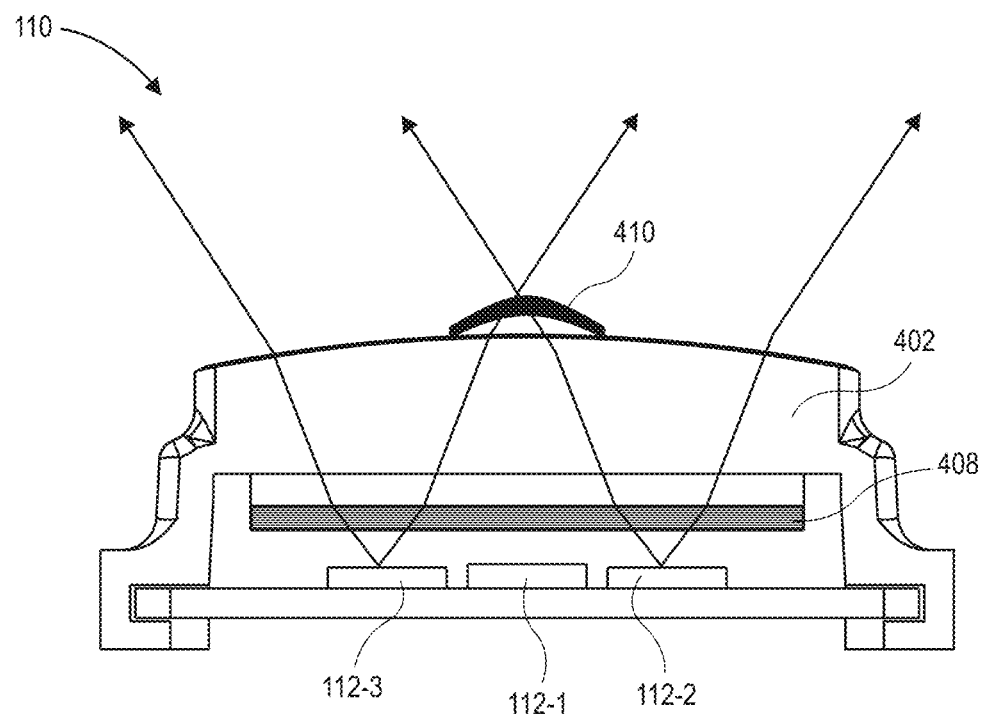
FIG. 10 a side view of the lens module of FIG. 8, showing a first example beam pattern.

Referring to FIGS. 5-7, one example of lens module 110 is illustrated in more detail. Lens module 110 may include one or more light emitting elements 112 and a lens 402 positioned above light emitting elements 112. The lens 402 may include a body 416, a lower surface 404, and an upper surface 406. The lower surface 404 is directed towards, and positioned nearest, the light emitting elements 112, so that light generated by the light emitting elements 112 passes through lower surface 404, into body 416, and out upper surface 406.

The lens module 110 additionally includes one or more Fresnel structures to improve the lighting performance of lens module 110. In one example, lens module 110 includes a first Fresnel structure 408 disposed on the lower surface 404 of the lens 402. The first Fresnel structure 408 is configured disperse light generated by one or more of the light emitting elements 112 the body 416 of the lens 402.

The first Fresnel structure 408 may be formed directly into lens 402, such by machining, engraving, or otherwise changing the structure of lens 402 to include the Fresnel structure 408. First Fresnel structure 408 may also be a discrete element, independent of lens 402, that is adhered or otherwise coupled to the lower surface 404 of the lens.

The first Fresnel structure 408 disperses light passing through it by altering the direction of the light rays as they interact with the structured surface. This structure consists of a series of concentric grooves or ridges, each acting as an individual refractive surface. When light generated by the light emitting elements 112 encounters these grooves, it is refracted at varying angles depending on the specific shape and orientation of each groove. This refraction process causes the light to spread out or diverge as it passes through the lower surface 404, enters the body 416 of the lens 402, and continues through to the upper surface 406. The dispersion effect created by the Fresnel structure 408 ensures a more uniform distribution of light, reducing hotspots and enhancing overall illumination performance.

The first Fresnel structure 408 may be configured as a linear Fresnel structure that includes a plurality of parallel grooves. Each groove in the linear Fresnel structure is designed to act as an individual refractive element. The parallel grooves are typically arranged in a consistent, repetitive pattern along the lower surface 404 of the lens 402. When light from the light emitting elements 112 strikes these parallel grooves, the grooves refract the light at specific angles, causing the light to spread out linearly. This linear dispersion of light is effective in redirecting and spreading the light over a wider area in a controlled manner.

The specific design parameters of the parallel grooves, such as their width, depth, and spacing, are critical in determining the precise manner in which the light is refracted and dispersed. These parameters can be adjusted to achieve the desired optical performance, ensuring that the light passing through the lower surface 404 is uniformly distributed across the body 416 of the lens 402 and exits through the upper surface 406.

Figure 12:
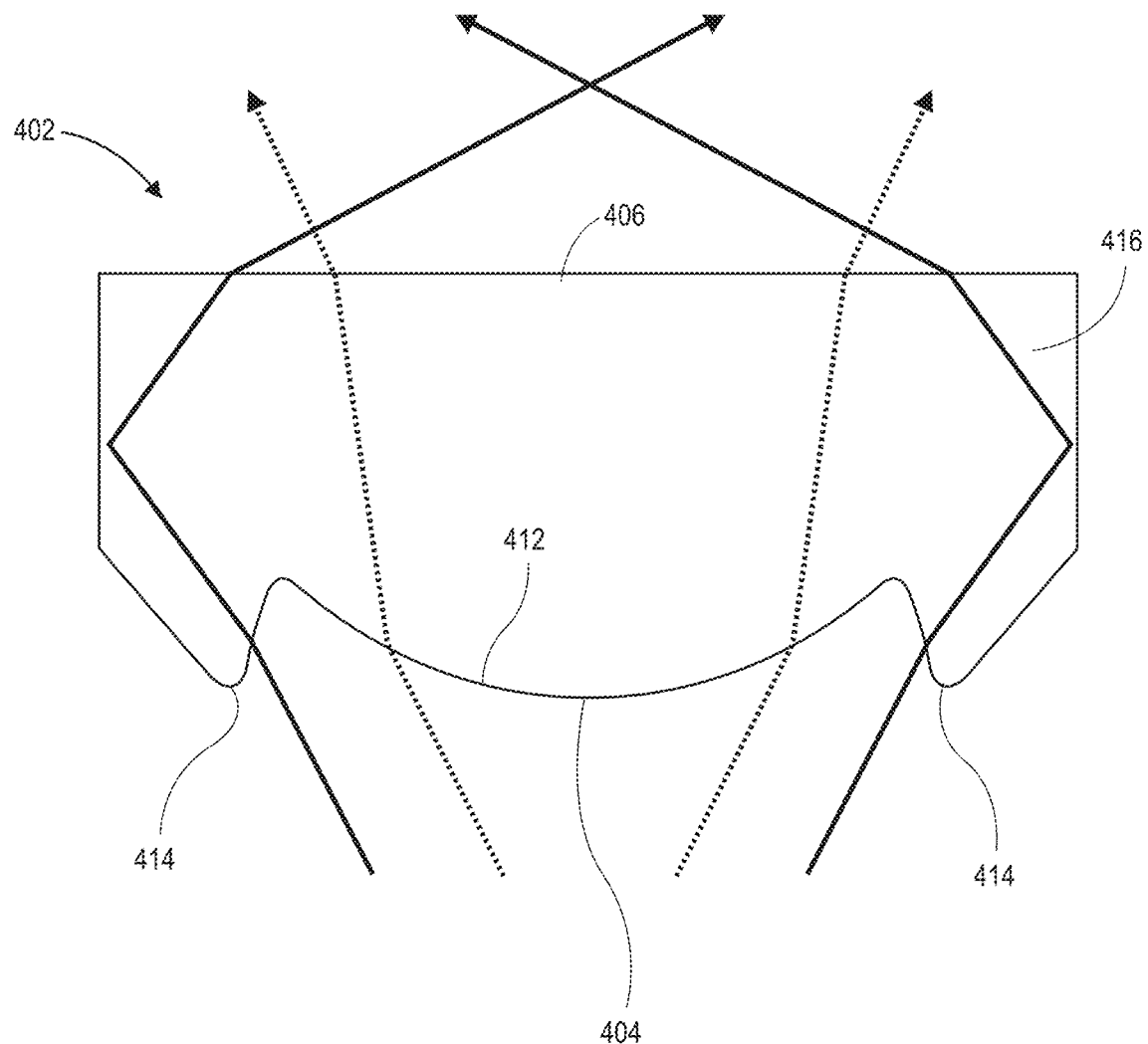
FIG. 12 is an example beam pattern generated by a lens associated with the lens module of FIG. 5.

Referring now to FIGS. 7 and 12, lower surface 404 may include an arcuate center portion 412 positioned between descending protrusions 414. The first Fresnel structure 408 is disposed on at least portions of arcuate center portion 412 and descending protrusions 414. The combination of the Fresnel grooves, the arcuate surface of center portion 412, and the protrusions 414 ensure uniform and consistent passage of light through lens 402, in contrast to the point lights that would be generated by light emitting elements 112 in the absence of lens 402. In the example of FIG. 12, light generated by light emitting elements 112 is bent upon passing into lens 402, internally reflected, and then exits upper surface 406 in a manner that generates uniform and dispersed illumination beyond what light emitting elements 112 could provide themselves. The curved nature of the arcuate center portion 412 allows it to manipulate the path of incoming light rays. By adjusting the curvature, the light can be focused into a narrower beam, dispersed into a wider pattern, or diffused to reduce glare and create a softer illumination. The descending protrusions 414 further aid in this process by providing additional surfaces for light interaction.

Other lens shapes that may be used in the lens module 110 include aspherical, cylindrical, and hemispherical designs. Aspherical lenses are designed to reduce aberrations and provide a sharper focus by gradually changing curvature from the center to the edge, which can improve image quality and light distribution. Cylindrical lenses focus light into a line rather than a point, making them suitable for applications requiring linear light distribution, such as in line scanners or certain types of lighting fixtures. Hemispherical lenses, which have a half-sphere shape, are effective for wide-angle light dispersion and can enhance the uniformity of illumination over a broad area. Each of these lens shapes can be tailored with specific surface modifications, such the first Fresnel structure 408, to optimize the performance for particular lighting requirements.

Meniscus and biconcave lens designs offer additional configurations for the lens 402. Meniscus lenses have one convex and one concave surface, creating a shape that can either converge or diverge light depending on the orientation. This design reduces spherical aberrations while providing a degree of light focusing or dispersing capability, useful for applications requiring precise light control. Biconcave lenses, characterized by two inwardly curved surfaces, are used to diverge light, spreading light rays apart as they pass through. This can be used for wide-angle illumination or for correcting specific optical aberrations in complex lens assemblies. Both meniscus and biconcave lenses can be incorporated into the lens 402, either independently or in combination with other lens shapes, to achieve the desired light distribution and optical performance.

The lens 402, including lower surface 404 and upper surface 406, may be formed of any material suitable to affect the light produced by light emitting elements. In embodiments, lens 402 may be formed from various optical materials, including glass, acrylic, and polycarbonate. Lens 402 can be formed from a combination of these materials by incorporating different layers or segments, each made from glass, acrylic, or polycarbonate, to leverage the specific optical and physical properties of each material. In one example, lens 402 is formed from a transparent thermoplastic polyamide based on aliphatic and cycloaliphatic monomers.

Upper surface 406 of lens 402 allows light to exit the body 416 of the lens 402 to pass into the user's environment. Upper surface 406 may include a convex shape to assist in dispersed illumination of generated light. In some configurations, upper surface 406 may include a haze layer to diffuse and further disperse light. This haze layer is created by applying a matte, textured coating or incorporating microstructures onto the upper surface 406, which scatters light as it passes through. The scattered light results in a more uniform and softer illumination, reducing glare and harsh shadows. Additionally, because light emitting elements 112 may include white LEDs formed by blue and yellow components, the haze layer can change the optical length of light exiting the body 416 to achieve a uniform "white" appearance.

In the examples of FIGS. 8-11, upper surface 406 of lens 402 includes a second Fresnel structure 410. The second Fresnel structure 410 is configured to focus light exiting the body 416 of the lens 402. The second Fresnel structure 410 may be similar in form and configuration to first Fresnel structure 408 and include various configurations to focus or otherwise disperse light in a desired form.

However, in some examples, including the illustrated examples, second Fresnel structure 410 is a circular Fresnel structure. The circular Fresnel structure may include a series of concentric circular grooves, each functioning as an individual refractive surface. When light from the body 416 of lens 402 encounters these grooves, the light is refracted at specific angles. The design of the circular Fresnel structure allows it to mimic the focusing properties of a conventional glass lens but with reduced thickness and weight. Each groove bends the light towards a common focal point, effectively concentrating the light into a more focused beam as it exits the upper surface 406.

In some examples, the second Fresnel structure 410, occupies only a portion of the upper surface 406 of the lens 402, so that light emitted from first light emitting element 112-1 passes through lens 402 and substantially through second Fresnel structure 410 (see FIG. 11) as opposed to other portions of upper surface 406. Light from one or more other light emitting elements 112-2, 112-3 more uniformly exits body 416 across upper surface 406. Such functionality allows the lens module 110 to provide varying lighting functionality that may be user selectable via buttons 106, display 104, and/or or the like.

Figure 11:
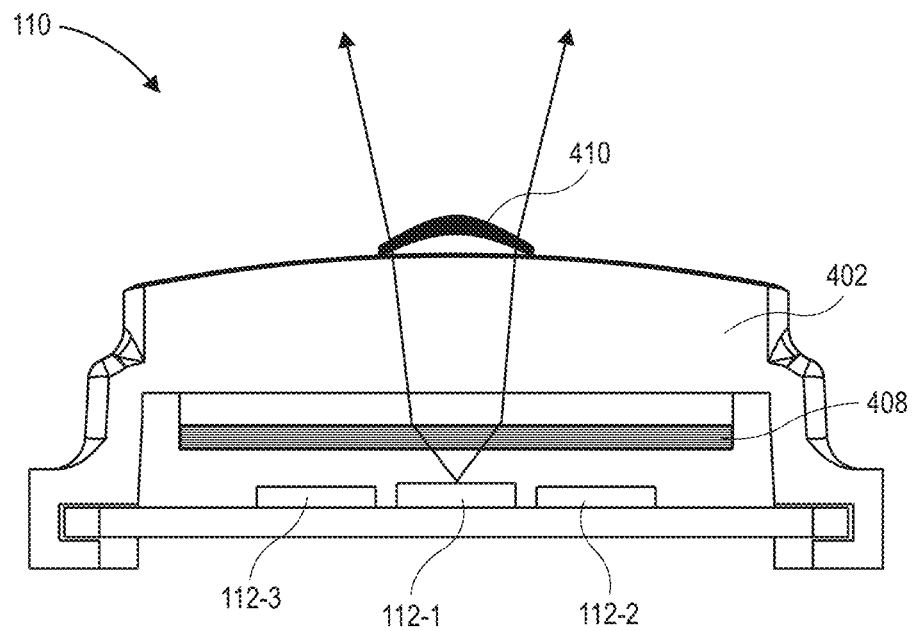
FIG. 11 a side view of the lens module of FIG. 8, showing a second example beam pattern.

For example, the configuration of FIG. 11, where the light generated by light emitting elements (such as element 112-1) substantially passes through second Fresnel structure 410 and not other portions of upper surface 406, provides "zoom" or "spotlight" type functionality where the beam-pattern of light exiting lens 402 is point-focused due the circular Fresnel structure. In contrast, the configuration of FIG. 10 produces more uniform light output as opposed to the concentrated effect of FIG. 11.

Different lighting effects can be created by selectively activating light emitting elements 112 to control what amount of light passes through second Fresnsel structure 410 as opposed to exiting upper surface 406 without going through the Fresnel structure 410. A user might prefer a more focused beam of light in situations requiring concentrated illumination on a specific area or object. For instance, in a workspace or task lighting scenario, a focused beam can provide precise lighting for detailed activities. Whereas diffuse light may be more suitable for illuminating a large area.

Device 100 can automatically transition between lighting modes and selectively activate various light emitting elements 112 to produce different lighting effects and colors based on sensed environmental conditions and user preferences, such as ambient light level, motion characteristics of the user, temperature, activity date, location, and the like. For example, during periods of high movement, such as when the user is walking and running and moving his or arms, a diffuse light pattern like that provided by FIG. 10 may be utilized. In contrast, when device 100 is substantially still, implying the user might be focusing on a particular object, the focused light pattern of FIG. 11 may be employed.

Device 100 may also toggle between lighting modes (such as the examples of FIGS. 10 and 11) to produce strobe and other optical effects. Such strobing might be useful when the user is running or otherwise exercise with device 100, such as running on a road at night, to alert others to the presence of the user. Additionally, in emergency situations the device 100 may also toggle between lighting modes, colors, intensities, and the like to produce strobing and other effects.

As used herein, "a number of" something can refer to one or more of such things. As will be appreciated, elements shown in the various embodiments herein can be added, exchanged, and/or eliminated so as to provide a number of additional embodiments of the present disclosure.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A wrist-wearable electronic device comprising:
   a housing including a face and a sidewall;
   a display supported by the face of the housing; and
   a lens module coupled to a sidewall of the housing, the lens module including:
   a first light emitting element,
   a lens positioned above the first light emitting element, the lens including a body, a lower surface, and an upper surface, wherein the lower surface is directed toward the first light emitting element,
   a first Fresnel structure disposed on the lower surface of the lens, the first Fresnel structure configured to disperse light generated by the first light emitting element into the body of the lens, and
   a second Fresnel structure disposed on the upper surface of the lens, the second Fresnel structure configured to focus light exiting the body of the lens.

2. The device of claim 1, further including a plurality of light emitting elements, wherein the first Fresnel structure is configured to disperse light generated by the plurality of the light emitting elements into the body of the lens.

3. The device of claim 1, wherein the first Fresnel structure is a linear Fresnel structure.

4. The device of claim 1, wherein the lens modules is coupled to the sidewall of the housing between a 10:00 and a 2:00 position on the housing.

5. The device of claim 1, wherein the display includes a touch screen configured to receive a user input from a user.

6. The device of claim 1, wherein the lower surface of the body includes an arcuate center portion positioned between descending protrusions, the first Fresnel lens being disposed on the arcuate center portion and at least a part of the descending protrusions.

7. A wrist-wearable electronic device comprising:
   a housing including a face and a sidewall;
   a display supported by the face of the housing; and
   a lens module coupled to a sidewall of the housing between a 10:00 and a 2:00 position on the housing, the lens module including:

a plurality of light emitting elements, a lens positioned above the light emitting elements, the lens including a body, a lower surface having an arcuate portion, and an upper surface, wherein the lower surface is directed toward the first light emitting element, and a linear Fresnel structure disposed on the lower surface of the lens, the linear Fresnel structure configured to disperse light generated by the first light emitting element into the body of the lens, the linear Fresnel structure including a plurality of parallel grooves.

8. The device of claim 7, further including a circular Fresnel structure disposed on the upper surface of the lens, the circular Fresnel structure configured to focus light exiting the body of the lens.

9. The device of claim 8, where in the circular Fresnel structure occupies only a portion of the upper surface of the lens, wherein a first one of the light emitting elements is positioned such that light passing from the first light emitting element through the lens body substantially exits through the circular Fresnel structure.

10. The device of claim 8, wherein the upper surface of the lens includes a haze to diffuse light exiting the lens body.

\* \* \* \* \*